United States Patent Office 2,702,275
Patented Feb. 15, 1955

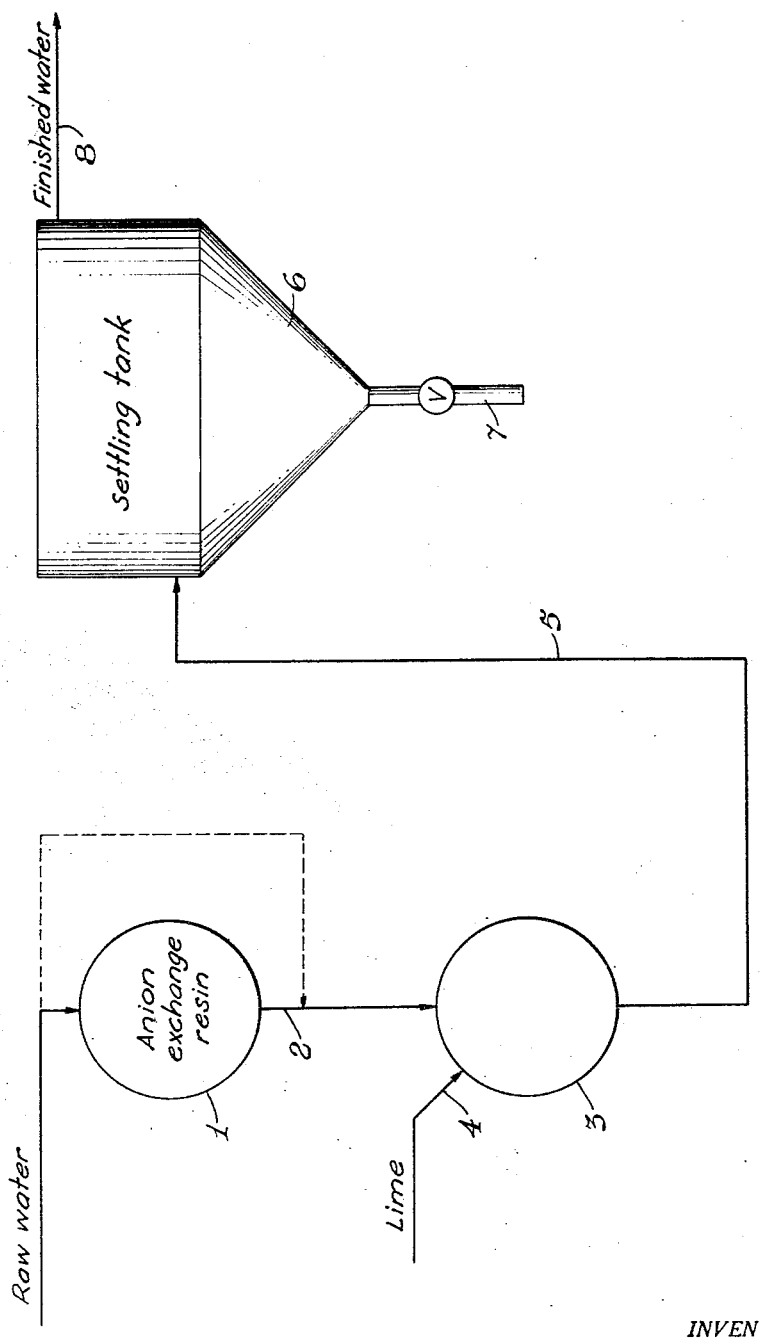

2,702,275

METHOD OF REMOVING DISSOLVED SOLIDS FROM WATER

William C. Bauman, Midland, Mich., assignor to The Dow Chemical Company, Midland, Mich., a corporation of Delaware Application December 29, 1948, Serial No. 68,034

5 Claims. (Cl. 210—24)

This invention concerns an improved method for removing dissolved alkaline earth metal compounds, particularly alkaline earth salts of strong mineral acids, from water while at the same time reducing the total salt content of the water.

Hard waters are generally referred to as being permanently hard when the hardness is due to dissolved alkaline earth salts of strong mineral acids, e. g. chlorides or sulphates of calcium or magnesium, and as being temporarily hard when the hardness is due to alkaline earth metal bicarbonates. Frequently, both types of hardness occur in a single body of water, e. g. from lakes, wells, or streams, etc. In addition to the alkaline earth metal salts which cause hardness, natural waters often have a considerable content of other salts such as alkali metal chlorides, sulphates, carbonates, or bicarbonates, etc. In some areas, e. g. along sea-coasts and in the southwestern part of the United States, water available in large quantities has a total salts content as high as, or higher than, may satisfactorily be tolerated for large scale purposes such as irrigation, household uses, or manufacturing operations, etc.

It is known to demineralize water by passing the same successively through a bed of an acidic form of a cation-exchange agent and a basic form of an anion exchange agent, but such complete demineralization is too costly for the treatment of large quantities of water for general purposes such as irrigation or household uses. Temporary hardness is sometimes removed by a liming operation to cause precipitation of calcium carbonate, but this method is not effectual when the hardness is of a permanent character. It is known to remove permanent hardness in other ways, such as by passage of the water over an alkali metal salt of a cation exchange agent, or by treating the water successively with lime and an alkali metal carbonate, but these methods do not reduce, and frequently increase, the total molar concentration of salts in the water. There is need for an economical method for both softening and reducing the total salts content of water.

It is an object of this invention to provide a method of treating water which accomplishes both of the purposes just stated. More specifically, it is an object of this invention to provide an improved water-softening method which is effective in removing, or reducing, the permanent hardness of water and also in reducing the total salts content of the water. Other objects will be apparent from the following description of the invention.

According to this invention, water containing alkaline earth metal salts of strong mineral acids, and usually other dissolved salts such as those hereinbefore mentioned, is softened by passing a stream of the raw water through one or more beds of a bicarbonate of a strongly basic anion exchange resin so as to introduce bicarbonate ions into the water and convert the alkaline earth metal salts of strong mineral acids to the corresponding bicarbonates, thereafter mixing lime with the water in amount sufficient to chemically react with the calcium bicarbonate therein and form calcium carbonate, passing the mixture into a settling tank, separating the calcium carbonate from the water and withdrawing water having a decreased solids content from the settling tank.

When water having permanent hardness caused by dissolved alkaline earth metal salts of strong mineral acids is passed into contact with a bed of a bicarbonate of a strongly basic anion exchange resin, the anions of the strong mineral acids are absorbed by the resin and displace bicarbonate ions into the water with formation of alkaline earth metal bicarbonates. When the water has permanent hardness and also contains alkali metal salts of strong mineral acids, e. g. sodium chloride or sodium sulphate, these latter compounds are also converted to the corresponding bicarbonates on contacting the water with the bicarbonate of a strongly basic anion exchange resin and may produce a finished water having excessive alkalinity if substantial proportions of the alkali metal compounds are present in the water. In such instance, the process may be modified by dividing the flow of raw water and passing only a part of the water into contact with a bed of the bicarbonate of a strongly basic anion exchange resin, thereafter combining the streams of raw and treated water and adding lime or calcium hydroxide to the mixture in amount chemically equivalent to react with the calcium bicarbonate in the mixture and form calcium carbonate, i. e. in molecular proportions equal to the calcium in the raw water contacted with the anion exchange resin.

In this connection, the proportion of the raw water on a volume basis, that is divided and contacted with the strongly basic anion exchange resin may vary depending upon the proportions of alkali metal and alkaline earth metal salts of strong mineral acids in the raw water and the quality of the water desired for a particular use, i. e. the permissible hardness and degree of alkalinity that is satisfactory for a given purpose. In general, decreasing the hardness of the water to a value usually equivalent to, or less than, 100 parts of calcium carbonate per million parts of water, which water has an alkalinity corresponding to a pH value of about 10 or lower, is satisfactory for most purposes, e. g. household, irrigation or industrial uses. Accordingly, when the water to be purified contains permanent hardness and also substantial proportions of alkali metal compounds, e. g. sodium chloride, the flow of raw water is divided and an amount of the same, on a volume basis, contacted with a bed of a bicarbonate of a strongly basic anion exchange resin such that when recombined with the remaining flow of raw water and subsequent treatment with lime and separation of calcium carbonate, the water flowing from the settling tank or precipitator has an alkalinity corresponding to a pH value not greater than 10.5.

The process may also be employed to decrease the solids content of water having both temporary and permanent hardness caused by dissolved alkaline earth metal bicarbonates and alkaline earth metal compounds of strong mineral acids. In this instance, the alkaline earth metal bicarbonates in the water pass unchanged through the bed of a strongly basic anion exchange resin containing quaternary ammonium bicarbonate groups while the alkaline earth metal salts of strong mineral acids are converted to the corresponding bicarbonates. On subsequent treatment of the water with lime the calcium and magnesium ions are precipitated as magnesium hydroxide and calcium carbonate respectively. Accordingly, an amount of lime is added to a volume of the treated water in molecular proportions equal to the sum of the molecular proportion of calcium and twice the molecular proportion of magnesium in a like volume of the raw water.

The accompanying drawing, in the form of a diagrammatic flow sheet, illustrates certain ways in which the process may be carried out. The drawing is not to be construed as limiting the invention.

In the drawing, the raw water to be purified, i. e. containing dissolved calcium compounds such as calcium chloride or calcium sulphate, is passed into contact with a bed of a bicarbonate of a strongly basic anion exchange resin in vessel 1 and flows from the resin through outlet line 2 into vessel 3 where it is mixed with lime, fed thereto via inlet line 4. The mixture of water and lime flows via conduit 5 into settling tank, or precipitator, 6 and the calcium carbonate is separated from the water by settling. Calcium carbonate is removed from the settling chamber through valved outlet 7. Water having a decreased solids content is withdrawn from the settling chamber 6 through outlet line 8 and is passed to service or points of use. The dotted line in the drawing illustrates a conduit for by-passing a portion of the flow of raw water around the anion exchange resin bed in vessel 1 when the water to be purified has permanent hardness and also contains substantial proportions of alkali metal salts such as sodium chloride, sodium sulphate, sodium bicarbonate or the like.

The anion exchange resins to be used in the process should be strongly basic. Any anion exchange resin which, when added in its basic, i. e. hydroxide, form to a 1 normal aqueous sodium chloride solution brings the latter to a pH value of 10 or above is suitable for use in the process. In general, water-insoluble anion exchange resins which are quaternary ammonium bases are satisfactory. A number of such water-insoluble resinous quaternary ammonium bases are described in an application Serial No. 68,058 of G. D. Jones filed on even date therewith.

In brief, an anion exchange resin which is a quaternary ammonium base, or a salt thereof, may be prepared by reacting a halomethylating agent such as chloromethyl methyl ether or bromomethyl methyl ether, with the normally solid higher polymers and copolymers of monovinyl-aromatic compounds, e. g. styrene, methylstyrene, chlorostyrene, vinylnaphthalene, etc., which copolymers frequently contain 20 per cent by weight or less of a polyvinyl-aromatic compound such as divinylbenzene, divinyltoluene, divinylnaphthalene, divinylxylene, etc., chemically combined, or interpolymerized, with the monovinyl-aromatic compound, to obtain halomethylated vinyl-aromatic resins having halomethyl radicals attached to its aromatic nuclei. Thereafter, such halomethylated vinyl-aromatic resin is reacted with a tertiary amine, e. g. to form a quaternary ammonium halide. The halomethylating reaction is carried out in the presence of a halomethylating catalyst, e. g. zinc chloride, stannic chloride, aluminum chloride, tin, zinc, iron, etc., while the polymer is swollen by, or dissolved in, an organic liquid which is less reactive with the halomethylating agent than is the polymer, such as an excess of the halomethylating agent.

The process of the invention may be carried out in any suitable apparatus such as conventional water softening vessels constructed of iron or steel. Flow through the vessels may be by gravity or under pressure. The calcium carbonate may be separated from the water by precipitation in a settling basin, tank, chamber, or precipitator such as is usually employed in water softening processes. A precipitator such as that described in the Water Conditioning Handbook, chapters 13 and 14, published in 1943 by The Permutit Company, New York city, may advantageously be employed in the process to separate the calcium carbonate from the water.

The following example illustrates practice of the invention, but is not to be construed as limiting the scope thereof.

Example

A stream of raw water having permanent hardness and containing calcium chloride, calcium sulphate and sodium chloride in amounts corresponding, on a weight basis, to one molecular proportion of each of the compounds per million parts of water is passed into contact with a bed of a bicarbonate of a strongly basic anion exchange resin. Said anion exchange resin consists of the reaction product of dimethylethanolamine with a chloromethylated copolymer of 85 parts by weight styrene, 9 parts ethylvinylbenzene and 6 parts divinylbenzene. It has an anion exchange capacity in excess of 20,000 grains of calcium carbonate per cubic foot of resin bed. The rate of flow of the water through the resin bed is adjusted so that the dissolved salts in the raw water are converted to the corresponding bicarbonates. Lime is fed into admixture with the stream of water flowing from the anion exchange resin in amount corresponding to two molecular proportions of calcium hydroxide per million parts of water. The mixture is passed into a settling tank and the calcium carbonate formed by reaction of the calcium hydroxide and calcium bicarbonate separated from the water. The water flowing from the settling chamber is saturated with calcium carbonate but is softened and has a considerably lower total solids content, on a molar basis, than the raw water subjected to treatment.

Other modes of applying the principle of the invention may be employed instead of those explained, change being made as regards the methods herein disclosed, provided the step or steps stated by any of the following claims or the equivalent of such stated step or steps be employed.

I claim:

1. A process for softening and decreasing the solids content of water having permanent hardness caused by dissolved calcium and magnesium compounds of strong mineral acids which comprises contacting the water supply with a strongly basic anion exchange resin composed of the reaction product of a vinyl-aromatic resin having halomethyl radicals attached to its aromatic nuclei with a tertiary amine and containing quaternary ammonium bicarbonate groups whereby the dissolved calcium and magnesium compounds of the strong mineral acids are converted to calcium and magnesium bicarbonates, then bicarbonates, mixing with the treated water an amount of lime chemically equivalent to react with the calcium and magnesium bicarbonates and precipitate calcium carbonate and magnesium hydroxide, and separating the precipitate from the water.

2. A process as claimed in claim 1 wherein the anion exchange resin consists of the reaction product of a vinyl-aromatic resin having halomethyl radicals attached to its aromatic nuclei and a tertiary alkyl amine.

3. A process as claimed in claim 1 wherein the anion exchange resin consists of the reaction product of a vinyl-aromatic resin having halomethyl radicals attached to its aromatic nuclei and dimethylethanolamine.

4. A process as claimed in claim 1 wherein the anion exchange resin consists of the reaction product of a vinyl-aromatic resin having halomethyl radicals attached to its aromatic nuclei and methyl-diisopropanolamine.

5. A process as claimed in claim 1 wherein the anion exchange resin consists of the reaction product of a vinyl-aromatic resin having halomethyl radicals attached to its aromatic nuclei and trimethylamine.

References Cited in the file of this patent

UNITED STATES PATENTS

| | | |
|---|---|---|
| 2,206,007 | Liebknecht | June 25, 1940 |
| 2,223,930 | Griessbach et al. | Dec. 2, 1940 |
| 2,341,907 | Cheetham et al. | Feb. 15, 1944 |
| 2,392,105 | Sussman | Jan. 1, 1946 |
| 2,404,367 | Durant et al. | July 23, 1946 |

FOREIGN PATENTS

| | | |
|---|---|---|
| 392,633 | Great Britain | May 25, 1933 |
| 549,111 | Great Britain | Nov. 6, 1942 |

OTHER REFERENCES

Booth: "Water Softening and Treatment," Archibald Constable Co. Ltd., London, 1906, pp. 19–26.